US007711455B1

(12) United States Patent
Cogan

(10) Patent No.: US 7,711,455 B1
(45) Date of Patent: May 4, 2010

(54) PROPULSION CONTROLLED AIRCRAFT COMPUTER

(75) Inventor: Bruce R. Cogan, Lancaster, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 740 days.

(21) Appl. No.: 11/463,485

(22) Filed: Aug. 9, 2006

(51) Int. Cl.
*G01C 23/00* (2006.01)

(52) U.S. Cl. .................. 701/3; 701/14; 701/36; 244/50; 244/51; 340/945; 123/406.12; 123/406.52

(58) Field of Classification Search ............ 701/3, 701/36, 14, 16; 123/406.52, 406.74, 406.12; 340/945; 244/50, 51
See application file for complete search history.

(56) References Cited

U.S. PATENT DOCUMENTS

| | | | | |
|---|---|---|---|---|
| 5,006,993 A * | 4/1991 | Virnig et al. | ................ | 701/99 |
| 5,019,980 A * | 5/1991 | Starr et al. | ................ | 701/35 |
| 5,029,778 A * | 7/1991 | DeLuca | ................ | 244/234 |
| 5,050,081 A * | 9/1991 | Abbott et al. | ................ | 701/14 |
| 5,136,841 A * | 8/1992 | Zimmerman | ................ | 60/233 |
| 5,330,131 A | 7/1994 | Burcham et al. | | |
| 5,761,625 A * | 6/1998 | Honcik et al. | ................ | 701/14 |
| 5,796,612 A * | 8/1998 | Palmer | ................ | 701/4 |
| 5,893,040 A * | 4/1999 | Gunn et al. | ................ | 701/15 |
| 6,041,273 A | 3/2000 | Burken et al. | | |
| 6,126,111 A | 10/2000 | Burcham et al. | | |
| 6,171,055 B1 * | 1/2001 | Vos et al. | ................ | 416/1 |
| 6,704,630 B2 * | 3/2004 | Ostrom et al. | ................ | 701/29 |
| 6,886,786 B1 * | 5/2005 | Huynh | ................ | 244/182 |
| 2005/0261810 A1 * | 11/2005 | Artini et al. | ................ | 701/3 |

OTHER PUBLICATIONS

Ken A. Norlin, Flight simulation software at NASA Dryden flight research center, Oct. 1995, NASA Technical memorandum 104315, pp. 1-18.*
Glenn B. Gilyard et al., Development and flight test results of an autothrottle control system at mach 3 cruise, Jul. 1980, NASA technical paper 1621, pp. 1-38.*
Nadine Sarter et al., Design of a use centered interface for supporting fault management in future intelligent propulsion systems, Aug. 2003-Sep. 2004, The Ohio state university, pp. 1-23.*
Gordon Fullerton, PCA emergency landing system may make air travel safer, Apr. 2005, NASA Facts,pp. 1-3.*
Frank W. Burcham, Jr et al., Preliminary flight results of a flight by throttle emergency flight control system on an F-15 airplane, Jun. 1993, NASA Technical memorandum 4503,pp. 1-16.*
John J. Burken et al., Flight test of a propulsion based emergency control system on the MD-11 airplane with emphasis on the lateral axis, Jul. 1996, NASA Technical memorandum 4746,pp. 1-15.*
Steve Gabel et al., Flight test of propulsion monitoring and diagnostic system, Mar. 2002, NASA/CR-2002-211485,pp. 1-76.*
Sanjay Garg, NASA Glenn research in controls and diagnostics for intelligent aerospace propulsion system,Dec. 2005, NASA/TM-2005-214036, pp. 1-32.*

* cited by examiner

*Primary Examiner*—Khoi Tran
*Assistant Examiner*—Jaime Figueroa
(74) *Attorney, Agent, or Firm*—Mark Homer

(57) ABSTRACT

A low-cost, easily retrofit Propulsion Controlled Aircraft (PCA) system for use on a wide range of commercial and military aircraft consists of an propulsion controlled aircraft computer that reads in aircraft data including aircraft state, pilot commands and other related data, calculates aircraft throttle position for a given maneuver commanded by the pilot, and then displays both current and calculated throttle position on a cockpit display to show the pilot where to move throttles to achieve the commanded maneuver, or is automatically sent digitally to command the engines directly.

10 Claims, 3 Drawing Sheets

PROPULSION CONTROLLED AIRCRAFT COMPUTER

STATEMENT OF GOVERNMENT INTEREST

This invention described herein was made by employees of the United States Government and may be manufactured and used by or for the Government for Government purposes without the payment of any royalties thereon or therefore.

BACKGROUND a. Field of Invention

The invention relates to aircraft flight-control systems and, more particularly, to a computer-assisted propulsion control system that enables a pilot to land a plane safely when its normal control surfaces such as elevators, rudders, and ailerons are disabled.

b. Background of the Invention

Aircraft flight-control systems are designed with redundancy to ensure low probability of failure. Nevertheless, there have been several instances of major flight-control-system failures. In these situations engine thrust becomes the last remaining mode of flight control. It is possible for pilots to control an aircraft using thrust by manually moving the throttles to maintain or change flight path and heading angles. However, this places a high work load on the pilots which may result in a crash and loss of life. The challenge lies in creating a means of sufficient degree of thrust-modulation control to safely fly and land a stricken airplane without causing a high pilot workload.

Propulsion Controlled Aircraft (PCA) is a computer-assisted engine control system that enables a pilot to land a plane safely when its normal control surfaces such as elevators, rudders, and ailerons are disabled. PCA is a damage mitigation technology that utilizes propulsive thrust for aircraft control in the event of partial or total loss of flight controls due to any failure including loss of hydraulics. Whether used in military or commercial aircraft, PCA has the potential to reduce the number of aircraft accidents due to loss of flight controls.

In the recent past, a PCA system has been developed and disclosed in U.S. Pat. No. 5,330,131 by Frank W. Burcham et al. (incorporated herein by this reference) based upon a program modification of an otherwise normal Flight Control Computer (FCC) that, in the event of a failure of the normal flight control system of a multiengine airplane, substitutes normal pitch axis control with symmetric control of the engines through their FCC driven servos using pitch attitude and pitch rate sensed by gyros to provide the feedback signals necessary to track a pitch command signal. That patented flight control system requires extensive modification not only of the FCC but also of each full-authority digital engine control (FADEC) computer for each engine.

More recently U.S. Pat. No. 6,041,273 to Burken et al. issued Mar. 21, 2000 disclosed an emergency control aircraft system using thrust modulation that compares the input flight path angle signal from a pilot thumbwheel with a sensed flight path angle to produce an error signal, an ultimately, an aircraft thrust control signal to drive a throttle servo for all engines. This effectively serves as an emergency backup system for a PCA that requires only program modification of the FCC without any changes in engine computers.

U.S. Pat. No. 6,126,111 to Burcham et al. issued Oct. 3, 2000 shows a further refinement to the foregoing emergency flight control system that additionally uses lateral fuel transfer to allow a pilot to regain control over an aircraft under emergency conditions. Here, where aircraft propulsion is available only through engines on one side of the aircraft, lateral fuel transfer provides the means by which the center of gravity of the aircraft can be moved over to the wing associated with the operating engine, thus inducing a moment that balances the moment from the remaining engine, allowing the pilot to regain control over the aircraft.

Unfortunately, all of the foregoing and all other known current implementations of PCA require expensive modifications to aircraft software and hardware as well as recertification of the aircraft. It would be greatly advantageous to provide a PCA capability at a fraction of the cost of full implementation for widespread commercial and military deployment.

SUMMARY OF THE INVENTION

It is, therefore, an object of the present invention to provide a cost-effective computer-assisted propulsion control system that enables a pilot to land a plane safely when its normal control surface such as elevators, rudders, and ailerons are disabled.

It is another object to provide a propulsion control system that avoids expensive modifications to aircraft software and hardware or the need for major recertification of the aircraft.

According to the present invention, the above-described and other objects are accomplished by providing a low cost system and method of implementing Propulsion Controlled Aircraft (PCA) technology on a wide range of commercial and military aircraft. The system is an intelligent Propulsion Controlled Aircraft Computer (PCAC) that reads in aircraft data including aircraft state, pilot commands and other related data. The system runs a software program that calculates aircraft throttle position for a given maneuver (heading change, climb, descent, flare, etc.). The calculated aircraft throttle position for the given maneuver is then displayed on a cockpit display to show the pilot where to move throttles to achieve the commanded maneuver, or is automatically sent to command the engines (in aircraft equipped with engines capable of receiving digital command signals). The PCAC may be a conventional computer platform such as a standard laptop PC with peripheral slot. A Bus Monitor card is inserted in the peripheral slot for communications over the aircraft data buses. The Bus Monitor card reads the aircraft data buses to provide aircraft state and pilot commands. The system also includes a display which may be on the laptop or separate display closer to the pilots. The PCAC runs a software program comprising three major software subroutines. A first software subroutine monitors the aircraft data bus (via the Bus Monitor card) and processes data from the Bus Monitor card. The software also comprises a second PCA subroutine that calculates necessary throttle command based on current aircraft state and desired maneuvers. A third subroutine formats the calculated throttle command as well as the actual monitored aircraft data and, based on aircraft state and desired maneuvers, generates a PCA display showing current and commanded throttle position to show the pilot where to move throttles to achieve the commanded maneuver. Alternatively the third subroutine may generate a PCA command signal that is directly communicated to the engines for automatic control (in aircraft equipped with engines capable of receiving PCA signals). In either case the system can be retrofitted to any aircraft (military or commercial), which has a data bus. Thus, no changes are required to aircraft control software and only minimal hardware changes.

DETAILED DESCRIPTION OF THE PREFERRED EMBODIMENT

The present invention is an intelligent Propulsion Controlled Aircraft Computer (PCAC) for implementing Propulsion Controlled Aircraft (PCA) technology in a low cost way on a wide range of commercial and military aircraft. The PCAC reads the existing aircraft data buses, runs a PCA algorithm to calculate throttle commands necessary for a given thrust-control maneuver, and then drives a display with a readout that makes a throttle-controlled landing possible for the pilot. More specifically, the PCAC reads in aircraft data including aircraft state, pilot commands and other related data. If the pilot commands include a desired maneuver (heading change, climb, descent, flare, etc.), the PCAC then calculated aircraft throttle position necessary to complete the desired maneuver and then generates a display to show the pilot where to move throttles to achieve the commanded maneuver. As an alternative to the visual display, the system is also capable of deploying command signals to automatically control the engines (in aircraft equipped with engines capable of receiving PCA signals). The PCAC may be a conventional computer platform running software to be described.

Figure 1:
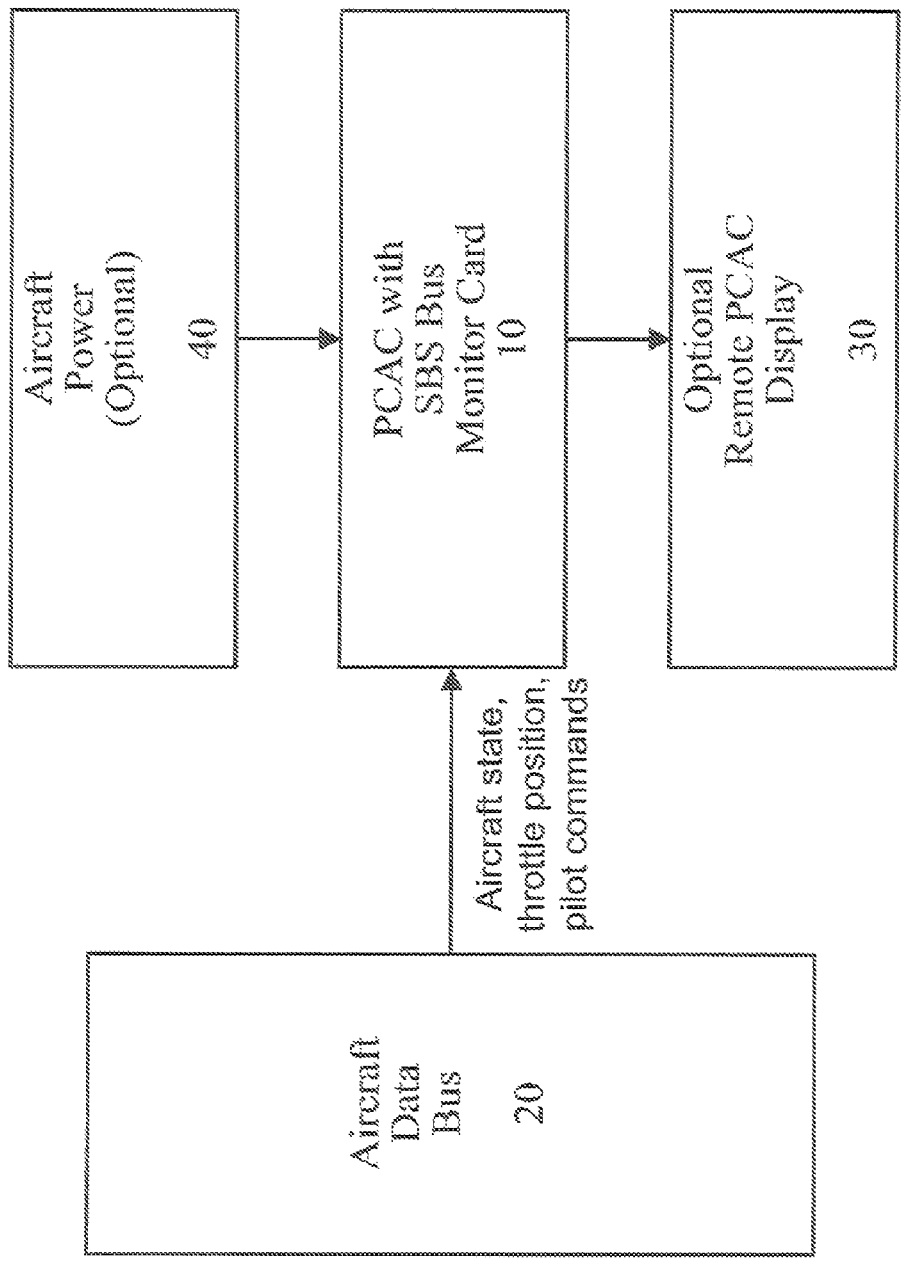
FIG. 1 is a system block diagram of the PCAC 10 with aircraft connections to existing aircraft data buses 20 and optionally to aircraft power 40.

FIG. 1 is a system block diagram of the PCAC 10 with aircraft connections to the existing aircraft data buses 20 and optionally to aircraft power 40. The presently-preferred PCAC 10 is a standard laptop with PCI peripheral slot equipped with a conventional Bus Monitor card inserted in the peripheral slot. An SBS Technologies™ PCMCIA2 bus monitor card is suited for present purposes, and the selected card may alternatively be a MIL-STD-1553 data bus (for military aircraft) or an ARINC 429 or 629 bus (commercial aircraft). The PCAC 10 via its bus monitor card monitors the aircraft data buses 20 to provide aircraft state and pilot commands. The PCAC 10 is most easily installed on an existing aircraft by connecting cables from the PCAC bus monitor card to the aircraft's "mod block." Mod blocks are standard on most commercial and military aircraft and are used to access the aircraft data bus for testing and data collection.

The PCAC 10 also includes a display which can be the either the lap top display itself, or an optional remote display 30 such as a separate, smaller monitor, closer to the pilots. A remote display 30 may provide better visual access to the pilot, but may incur larger modifications to the aircraft.

As mentioned, the PCAC 10 may optionally be connected to the aircraft power bus 40. Connecting the PCAC 10 to aircraft power, if available, avoids possible time delays and ensures that power is always available.

The PCAC 10 runs a software program comprising three major PCA software subroutines. All three PCA software subroutines may be written in standard programming language such as C++. The software PCA subroutines include: 1) A data bus monitoring subroutine that processes aircraft state data collected by PCAC 10 via the bus monitor card; 2) a PCA subroutine that calculates necessary throttle command based on the aircraft state data collected by the data bus monitoring subroutine, in view of desired maneuvers; and 3) a PCAC Display subroutine that takes the calculated throttle command from the PCA subroutine and graphically displays both current throttle position and desired throttle position needed to achieve the desired maneuvers. Each of these subroutines is described in more detail.

1. The data bus monitoring subroutine uses conventional call functions (embedded in the operating system) to a Dynamically Linked Library (DLL) to read selected parameters from the aircraft data bus. Conventional bus monitor cards such as the SBS Technologies™ PCMCIA2 bus monitor card are packaged with a DLL that is installed on PCAC 10 to read the selected parameters from the aircraft data buses 20, and for present purposes these parameters includes both aircraft state parameters as well as pilot commands. The aircraft state parameters include pitch angle, roll angle, pitch rate, roll rate, angle of attack, airspeed, and throttle positions. The pilot commands include commanded flight path angle, commanded roll angle, and commanded heading. The data bus monitoring subroutine uses the call functions to DLL Library to read these parameters from the aircraft data bus.

2. The foregoing aircraft state parameters and pilot commands are then made available to the PCA subroutine, which then calculates the throttle command required to obtain the pilot commanded aircraft state. The calculations of throttle command required to obtain the pilot-commanded aircraft state as employed in the present PCA algorithm have been determined empirically using MATLAB™ by Mathworks in a flight simulator of the target aircraft. Once the correlation of throttle commands are developed, they may be easily auto-coded into a C++ PCA subroutine which is then loaded on the PCAC 10.

3. The PCAC display subroutine is designed to take the output from the PCA subroutine above and display current throttle positions and limits based on the original data from the aircraft data bus. The PCAC display subroutine also shows commanded throttle positions based on the calculations in the PCA subroutine above.

In operation, the PCAC 10 is powered on and the main PCAC software is run to initiate the three subroutines. The data bus monitoring subroutine will begin to make call functions to the DLL to read the selected parameters from the aircraft data bus, and the PCA subroutine will begin to calculate throttle commands for current commanded aircraft state. Thus for example, if a pilot commands a new aircraft state such as a 15 degree left bank (typically using the aircraft mode control panel), this command is read from the data bus by the PCAC 10 which then calculates the throttle command required for this maneuver. The new throttle command is then displayed on the PCAC 10 or remote display 30 according to a particular display format that allows the pilot to easily adjust the actual throttle positions manually to the commanded throttle position in order to complete a desired maneuver.

Figure 2:
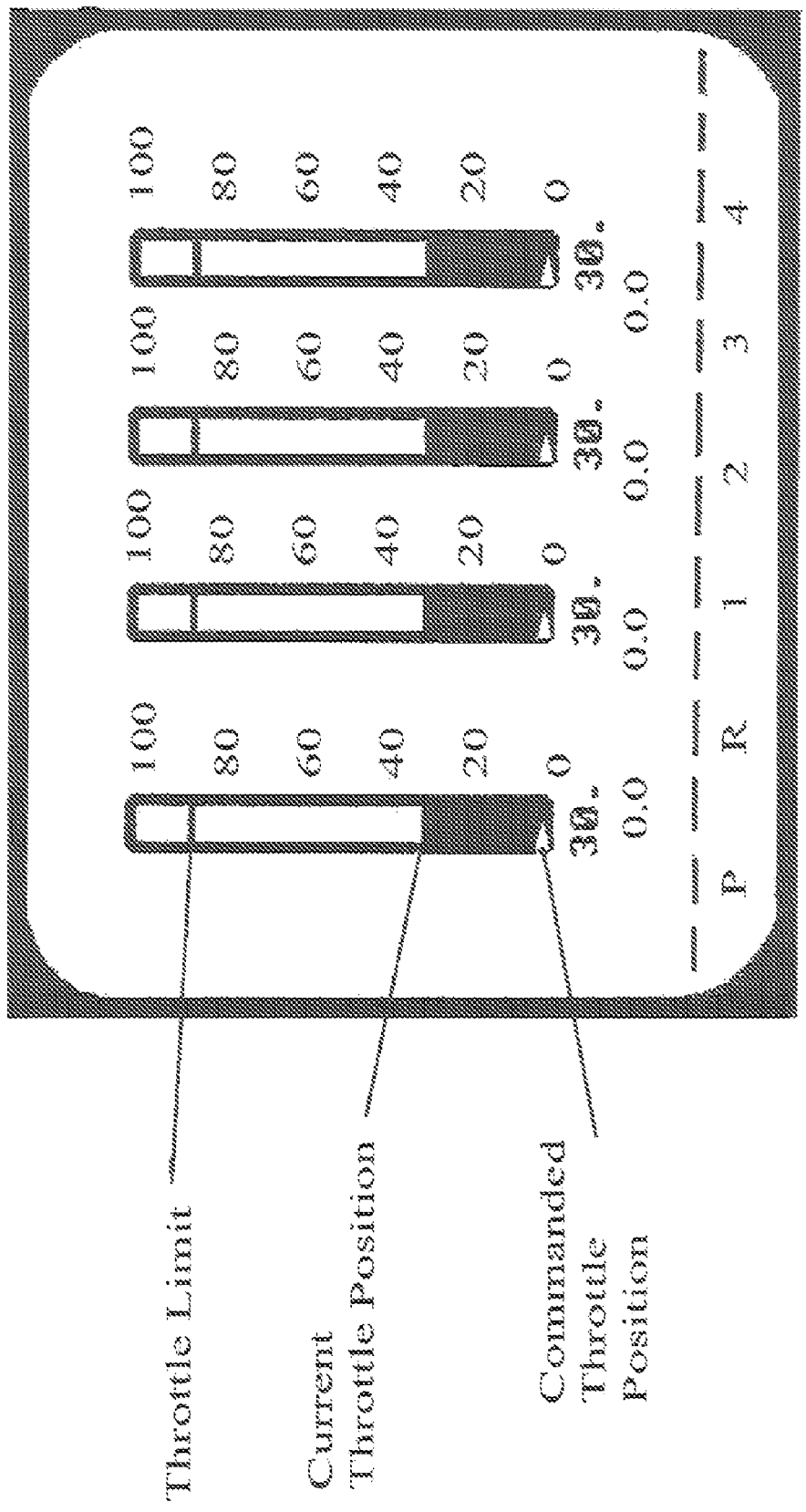
FIG. 2 is a screen shot of the display format compiled by the PCAC display subroutine for a four-engine aircraft.

FIG. 2 is a screen shot of the display format compiled by the PCAC display subroutine in a four-engine aircraft. As indicated the PCAC display subroutine shows throttle limit, current throttle position, and commanded throttle position in a bar-graph format for each of the four engines based on the calculations in the PCA subroutine above. This allows the pilot to easily adjust the actual throttle positions manually to the commanded throttle position in order to complete a desired maneuver. The PCAC display subroutine that generates the FIG. 2 display may be authored using GL Studio™, a tool for building interactive, real time graphical displays using open-source GLTM graphics language. The pilot must then manually move the throttles to this new position to complete the desired maneuver.

A number of variations on the basic concept will now be described. For example, instead of using a display 30, the PCAC 10 can be used to drive the engines directly to complete the commanded maneuver. In this case all throttle commands are sent directly to the electronic engine control (EEC) of the aircraft for implementation. This will require a minor interface to the electronic engine control but not the flight control software.

Also many aircraft currently have electronic flight computers already installed in their cockpit for various functions, and some of these computers already have access to data bus parameters. Thus, instead of using a dedicated computer for PCAC 10 it may be possible to rely on an existing onboard computer for the above-functionality.

A specific example of the above-described propulsion control system (inclusive of PCAC 10) will now be described which provides a digital throttle input to the existing C17/F117 Electronic Engine Control (EEC) unit.

Figure 3:
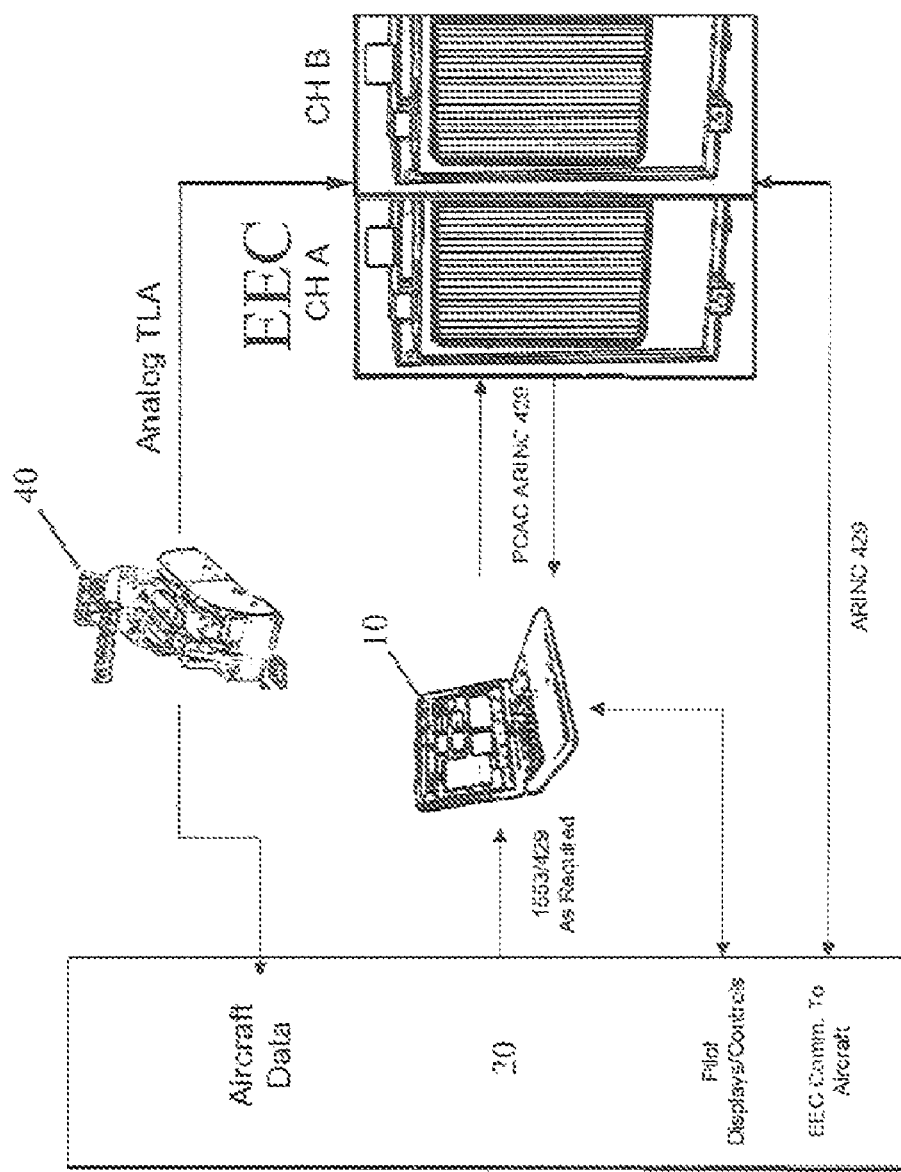
FIG. 3 is a diagram of an exemplary implementation for a PCAC 10 to C-17/F117 Electronic Engine Control (EEC) interface.

FIG. 3 is a detailed diagram of the PCAC 10 to C-17/F117 Electronic Engine Control (EEC) interface. The C-17/F117 currently employs two Electronic Engine Controls (EEC Channel A and Channel B) which provide throttle commands to the engines via an analog signal from the pilots throttle quadrant or from an ARINC-429 digital signal from the flight control computer converted to an analog signal. For this implementation the C-17/F117 Electronic Engine Control (EEC) is adapted to translate the ARINC-429 digitally driven signal from the PCAC 10 into existing analog Throttle Resolver Angle (TRA) inputs, instead of the signal from the aircraft flight control computer. In this case the PCAC 10 is equipped with a Condor™ ARINC-429 receiver/transmitter bus card and four channels of this card are coupled to one aircraft EEC (Channel A) to establish digital control of the engines. The PCAC 10 then effectively becomes the source of the digital TRA signals.

As seen in FIG. 3 the laptop PCAC 10 coupled through its onboard ARINC-429 receiver/transmitter bus card to the two channels A & B of the spare low speed ARINC-429 receiver/transmitter and on to the existing aircraft EEC via the aircraft data bus 20. The PCAC 10 is also coupled the aircraft's data bus 20 (here a Mil Std 1553 data bus) to monitor aircraft state, pilot commands and throttle position. The PCAC 10 is running the software comprising the three major software subroutines: 1) data bus monitoring; 2) PCA subroutine; and 3) PCAC Display.

In operation, the PCAC 10 reads the aircraft data bus 20, and runs the three software PCA subroutines (described above). The PCA subroutine calculates necessary throttle command based on the aircraft state data collected by the data bus monitoring subroutine, in view of desired maneuvers, and the PCAC Display subroutine graphically displays both current throttle position and desired throttle position as shown in FIG. 2 needed to achieve the desired maneuvers. Optionally, the PCAC 10 may output an engine command directly to the EEC for direct control. In this case, in order for the PCAC 10 to provide a digital throttle input to the existing C17/F117 Electronic Engine Control (EEC) unit, certain software modifications are necessary to the C-17/F117 Electronic Engine Control (EEC) interface. The EEC software is modified to check for signal validity, correct limits and other parameters, engage digital throttle control, and to then send throttle control commands to the engine. Specifically, in the context of the C-17/F117 implementation, the PCAC 10 monitors all ARINC-429-bus communications from the aircraft EEC. When bus communication is detected at the PCAC 10, the prescribed digital throttle engagement sequence is followed by the prescribed disengagement sequence.

Either way, the PCAC 10 enables a pilot to land a plane safely when its normal control surfaces such as elevators, rudders, and ailerons are disabled, and yet expensive modifications to aircraft software and hardware or the need for major recertification of the aircraft are uneccessary. It should now be apparent that the foregoing system provides a PCA capability at a fraction of the cost of full implementation for widespread commercial and military deployment.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

I claim:

1. A Propulsion Controlled Aircraft (PCA) system, comprising:
    a Propulsion Controlled Aircraft Computer (PCAC)
    a Bus Monitor card in said PCAC and connected to an existing aircraft communications bus for monitoring of aircraft state and pilot commands thereon;
    a display monitor; and
    a software program resident on said Propulsion Controlled Aircraft Computer (PCAC), and further including,
        a first software subroutine for monitoring the aircraft data bus for collecting the aircraft state and pilot commands associated with propulsion only control of an aircraft,
        a second software subroutine for calculating necessary throttle position based on the aircraft state and pilot commands to complete a desired maneuver, and
        a third software subroutine for formatting the calculated throttle position as well as the actual monitored aircraft data and, based on aircraft state and desired maneuvers, generating a PCA output for throttle position.

2. The Propulsion Controlled Aircraft (PCA) system according to claim 1, wherein said PCA output comprises a graphical display showing current and commanded throttle position to show the pilot where to move throttles to achieve the commanded maneuver.

3. The Propulsion Controlled Aircraft (PCA) system according to claim 1, wherein said PCA output comprises a throttle command to an existing electronic engine control (EEC) in said aircraft.

4. The Propulsion Controlled Aircraft (PCA) system according to claim 1, wherein said PCAC includes a display monitor, and said software is adapted to display both of said actual aircraft throttle position and intended aircraft throttle position for completing a desired maneuver.

5. The Propulsion Controlled Aircraft (PCA) system according to claim 4, wherein said software is adapted to display both of said actual aircraft throttle position and intended aircraft throttle position for each of a plurality of engines on said aircraft.

6. The Propulsion Controlled Aircraft (PCA) system according to claim 5, wherein said software is adapted to display throttle limit, current throttle position, and commanded throttle position for each aircraft engine.

7. The Propulsion Controlled Aircraft (PCA) system according to claim 6, wherein said software is adapted to display throttle limit, current throttle position, and commanded throttle position in a bar-graph format for each of the aircraft engines.

8. The Propulsion Controlled Aircraft (PCA) system according to claim 1, wherein said Propulsion Controlled Aircraft Computer (PCAC) is adapted to transmit throttle commands directly to an existing electronic engine control (EEC) of the aircraft for implementation.

9. The Propulsion Controlled Aircraft (PCA) system according to claim 1, wherein said PCAC is a laptop computer equipped with a bus monitor card.

10. The Propulsion Controlled Aircraft (PCA) system according to claim 1, wherein said PCAC is an existing onboard-aircraft computer.

* * * * *